United States Patent
Shanbhag

(10) Patent No.: US 8,387,695 B1
(45) Date of Patent: Mar. 5, 2013

(54) COMPOSITIONS AND PROCESSES FOR DOWNHOLE CEMENTING OPERATIONS

(75) Inventor: Ruchir M. Shanbhag, Riverside, CA (US)

(73) Assignee: Newbasis West LLC, Riverside, CA (US)

( * ) Notice: Subject to any disclaimer, the term of this patent is extended or adjusted under 35 U.S.C. 154(b) by 0 days.

(21) Appl. No.: 13/531,540

(22) Filed: Jun. 23, 2012

(51) Int. Cl.
*E21B 33/138* (2006.01)
*E21B 33/14* (2006.01)
*C09K 8/44* (2006.01)

(52) U.S. Cl. ........ 166/295; 166/292; 166/300; 507/219; 507/220; 507/269; 523/130

(58) Field of Classification Search .................. None
See application file for complete search history.

(56) References Cited

U.S. PATENT DOCUMENTS

| | | | |
|---|---|---|---|
| 3,416,604 A * | 12/1968 | Rensvold | 166/295 |
| 5,547,027 A * | 8/1996 | Chan et al. | 166/295 |
| 5,712,314 A * | 1/1998 | Surles et al. | 166/295 |
| 6,330,917 B2 | 12/2001 | Chatterji et al. | |
| 6,593,402 B2 | 7/2003 | Chatterji et al. | |
| 7,748,455 B2 | 7/2010 | Burts et al. | |
| 7,757,765 B2 | 7/2010 | Hilleary et al. | |
| 7,798,225 B2 | 9/2010 | Giroux et al. | |
| 8,124,569 B2 | 2/2012 | Khan et al. | |
| 8,137,051 B2 | 3/2012 | Glenn et al. | |
| 2005/0230112 A1 * | 10/2005 | Reddy et al. | 166/293 |
| 2006/0118301 A1 * | 6/2006 | East et al. | 166/280.2 |
| 2010/0270023 A1 * | 10/2010 | Dusterhoft et al. | 166/308.6 |

OTHER PUBLICATIONS

Zeldin, A.N., Kukacka, L.E., Carciello, N. "A New, Novel Well-Cementing Polymer-Concrete Composite," BNL 29502, Sep. 1980.

* cited by examiner

*Primary Examiner* — George Suchfield
(74) *Attorney, Agent, or Firm* — Gregory L. Porter; Andrews Kurth LLP

(57) ABSTRACT

The present invention relates to methods of cementing, for example, an oil or gas well. The method may involve pumping a suspension of a filler mixture and at least about 5 weight percent of a thermosetting resin based on the total weight of resin and filler mixture. Advantages may include superior properties and reliability as compared to conventional cementing operations often involving Portland cement.

18 Claims, No Drawings

COMPOSITIONS AND PROCESSES FOR DOWNHOLE CEMENTING OPERATIONS

FIELD OF THE INVENTION

The instant invention pertains to, for example, novel compositions and processes for downhole cementing operations.

BACKGROUND AND SUMMARY OF THE INVENTION

As part of the wellbore construction process, a hole or wellbore is typically drilled into the earth and then often lined with a casing or liner. Usually sections of casing or liner are threaded together or otherwise connected as they are run into the wellbore to form what is sometimes referred to as a "string." Such casing may comprise a steel tubular "pipe" having an outer diameter that is smaller than the inner diameter of the wellbore. Because of the differences in those diameters, an annular area occurs between the inner diameter of the wellbore and the outer diameter of the casing. Absent the presence of anything else, wellbore fluids and earth formation fluids may migrate lengthwise along the wellbore in that annular area.

Wells are typically constructed in stages. Initially a hole is drilled in the earth to a depth at which earth cave-in or wellbore fluid control become potential issues. At that point, drilling is stopped and casing is placed in the wellbore. While the casing may structurally prevent cave-in, it will not prevent fluid migration along a length of the well in the annulus. For that reason, the casing is typically cemented in place. To accomplish that, a cement slurry is pumped down through the casing and out the bottom of the casing. Drilling fluid, water, or other suitable wellbore fluid is pumped behind the cement slurry in order to displace the cement slurry into the annulus. Typically, drillable wiper plugs are used to separate the cement from the wellbore fluid in advance of the cement volume and behind it. The cement is left to cure in the annulus thereby forming a barrier to fluid migration within the annulus. After the cement has cured, the cured cement remaining in the interior of the casing is drilled out and the cement seal or barrier between the casing and the formation is pressure tested. If the pressure test is successful, a drill bit is then run through the cemented casing and drilling is commenced from the bottom of that casing. A new length of hole is then drilled, cased, and cemented. Depending on the total length of well, several stages may be drilled and cased.

Unfortunately, the cements employed for the aforementioned operations often suffer from a variety of deficiencies. For example, the cements may not have sufficient strength, flexibility, or toughness to withstand the pressures, corrosion, and other stresses that may often be encountered downhole. Failure of the cement may lead to disastrous and expensive consequences to the well and/or the surrounding environment. Similarly, currently available cements may be cumbersome to process. For example, hexavalent chromium compounds and other particulates in the cement may require that special handling procedures are implemented so as to limit worker exposure to such hazardous materials. Accordingly, what is needed are new cement compositions and processes that solve one or more of these deficiencies with conventional cement used in downhole oil and gas operations.

Advantageously, the instant invention reduces or eliminates one or more of the mentioned deficiencies with the prior art cementing compositions and processes. In one embodiment the invention involves a novel method of cementing a well. The method comprises the step of pumping a suspension. The suspension comprises a filler mixture and at least about 5 weight percent of a thermosetting resin based on the total weight of resin and filler mixture. The suspension cures when subjected to a catalyst. The cured composition comprises one or more of the following characteristics (a) through (g): (a) a tensile strength of at least about 300, 1000, 1500 psi according to ASTM C1273 with a 0.01 inch/min of cross-head speed at ambient 25C at 50% humidity; (b) a compression strength of at least about 1500, 2000, 3000, 10,000 psi according to ASTM C873 with a 0.01 inch/min of cross-head speed at ambient 25C at 50% humidity; (c) a flex strength of at least about 500 psi, 750, 1000 according to ASTM C873 with a 0.01 inch/min of cross-head speed at ambient 25C at 50% humidity; (e) a fracture toughness of at least about 0.3 Mpa root meter, pref. 0.6, 08 according to ASTM C1421; (0 a ratio of tensile strength to compressive strength of at least about 10, 15%, 20, and 30 wherein the tensile strength is measured according to ASTM C1273 with a 0.01 inch/min of cross-head speed at ambient 25C at 50% humidity and the compression strength is measured according to ASTM 873 with a 0.01 inch/min of cross-head speed at ambient 25C at 50% humidity; and (g) a flex fatigue resistance such that the cured composition can be subjected to a stress of 50% of the cured composition's ultimate failure strength for at least 1000 cycles without breaking.

In another embodiment, the invention relates to a composition comprising: (1) from about 10 to about 25 weight percent of a thermosetting resin based on the total weight of the composition; (2) from about 15 to about 25 weight percent of a microscopic filler based on the total weight of the composition; (3) from about 30 to about 70 weight percent of an aggregate based on the total weight of the composition; and (4) an intercalatable nanoclay, an exfoliatable nanoclay, or a mixture thereof.

In yet another embodiment, the instant invention relates to a method of cementing a subterranean formation. The method comprises pumping a suspension comprising (1) from about 15 to about 25 weight percent based on the total weight of the suspension of a first component selected from the group consisting of calcium carbonate, talc, silica, and mixtures thereof; (2) from about 30 to about 70 weight percent based on the total weight of the suspension of a second component selected from the group consisting of crushed rock, gravel, sand and mixtures thereof; (3) from about 10 to about 25 weight percent based on the total weight of the suspension of a thermosetting resin; and (4) a catalyst capable causing the suspension to cure. The cured composition is characterized by a ratio of tensile strength to compressive strength of at least about 20 wherein the tensile strength is measured according to ASTM C1273 with a 0.01 inch/min of cross-head speed at ambient 25C at 50% humidity and the compression strength is measured according to ASTM 873 with a 0.01 inch/min of cross-head speed at ambient 25C at 50% humidity.

DETAILED DESCRIPTION OF THE INVENTION

General Process and Composition

The instant invention pertains in one embodiment to a method of cementing a well or other subterranean formation in, for example, oil and gas operations. The precise method and composition employed will vary depending upon a number of factors. Such factors include, for example, the nature and type of well, the depth, the fluids being employed and/or produced, pressures, temperatures, desired set times, available equipment, etc.

Generally, the methods employed will usually comprise a step of placing a suspension at a desired location by, for example, pumping the suspension and then allowing it to cure. The particular manner of pumping is not critical so long as the suspension is able to be pumped to the desired location. Such desired location may vary by well or application but is often an annular area that occurs between an inner diameter of a wellbore and an outer diameter of the casing. This may be accomplished in any convenient manner and usually introducing the suspension at a ground surface into an upper end of casing such that the suspension flows through to the bottom of the casing where it exits and then flows up an annulus. In this manner the suspension may be placed between the pipe and the walls of a well bore. Typical pumps and other methods generally used for conventional primary cementing applications may sometimes be employed in this step. General cementing methods and operations are described in, for example, U.S. Pat. Nos. 7,748,455; 7,757,765; 7,798,225; and 8,124,569 which are incorporated herein by reference to the extent that they are not inconsistent with the instant specification.

Suitable suspensions typically comprise (1) a filler mixture and (2) at least about 5 weight percent of a thermosetting resin based on the total weight of resin and filler mixture. By thermosetting resin is meant those resins which are usually capable of undergoing an irreversible phase transformation after, for example, curing. Advantageously, the suspension may be made to cure when subjected to a catalyst and usually may not require substantial amounts of Portland cement and the like as a binder or otherwise. This is useful in that the composition may lack substantial amounts of water and/or hexavalent chromium compounds. In some embodiments the suspension is substantially free of water, hexavalent chromium compounds, or both. In addition, unlike traditional cementing compositions, the compositions employed herein give off very little or no greenhouse gases like carbon dioxide during the setting process.

The cured composition often comprises one or more, two or more, three or more, four or more, five or more, six or more, or all of a number of useful characteristics.

Useful characteristics may include, for example, (a) a tensile strength of at least about 300, or at least about 1000, or at least about 1500 psi according to ASTM C1273 with a 0.01 inch/min of cross-head speed at ambient 25C at 50% humidity;

(b) a compression strength of at least about 1500, or at least about 2000, or at least about 3000, or at least about 10,000 psi according to ASTM C873 with a 0.01 inch/min of cross-head speed at ambient 25C at 50% humidity;

(c) a flex strength of at least about 500, or at least about 750, or at least about 1000 psi according to ASTM C873 with a 0.01 inch/min of cross-head speed at ambient 25C at 50% humidity;

(e) a fracture toughness of at least about 0.3, or at least about 0.6, or at least about 0.8 Mpa root meter according to ASTM C1421;

(f) a ratio of tensile strength to compressive strength of at least about 10, or at least about 15, or at least about 20, or at least about 30 wherein the tensile strength is measured according to ASTM C1273 with a 0.01 inch/min of cross-head speed at ambient 25C at 50% humidity and the compression strength is measured according to ASTM 873 with a 0.01 inch/min of cross-head speed at ambient 25C at 50% humidity; and/or (g) a flex fatigue resistance such that the cured composition can be subjected to a stress of 50% of the cured composition's ultimate failure strength for at least 1000, or at least 1500, or at least 2000 cycles without breaking.

Filler Mixture

The type and amount of filler mixture employed in the pumpable suspension may vary widely depending upon the thermosetting resin employed, as well as, the desired characteristics of the suspension and cured composition. Generally, the filler mixture may comprise an organic material, an inorganic material, or a mixture thereof. Typical materials that may be useful in the filler mixture include, for example, materials selected from the group consisting of calcium carbonate, kaolin, talc, silica, rock, gravel, sand, minerals, allotropic carbon, silicates, metallics, and mixtures thereof.

The amount of filler mixture in the suspension varies depending upon the other ingredients, desired application, and/or desired performance. Generally, the amount of filler mixture, i.e., non-thermosetting resin, in the suspension is usually at least about 50, or at least about 70, or at least about 95 weight percent based on the total weight of the suspension. On the other hand, the amount of filler mixture in the suspension is usually less than about 96, or less than about 90, or less than about 80 weight percent based on the total weight of the suspension. Similarly, the size of the component(s) in the filler mixture may vary widely and can be microscopic, macroscopic, or nanoscopic.

In some instances it may be useful to employ a mixture of two different components as the filler mixture. For example, the filler mixture may comprise a first component selected from the group consisting of calcium carbonate, talc, silica, and mixtures thereof and a second component selected from the group consisting of crushed rock, gravel, sand and mixtures thereof. In such instances, the first component may comprise at least about 10, or at least about 15 weight percent up to about 35, or up to about 25 weight percent wherein the weight percents are based on the total weight of resin and filler mixture. Similarly, the second component may comprise at least about 20, or at least about 30 weight percent up to about 80, or up to about 70 weight percent wherein the weight percents are based on the total weight of resin and filler mixture.

The particle size distribution of the first or second component is usually not critical so long as there is a homogeneous distribution The particle size distribution may be used to assist in controlling, for example, the rheological properties of the suspension. In particular, if employing the first and second components above, then the particle size distribution of the first component may be selected for desired properties. In this vein, a particle size distribution for the first component of at least about 0.5, or at least about 1, or at least about 5 micron up to about 50, or up to about 25, or up to about 10, or even 100 microns based on laser scattering may often prove beneficial.

Thermosetting Resin, Catalyst and Curing

Generally, the thermosetting resin is mixed with the filler mixture in any convenient manner and in any convenient order. Heating is not usually necessary but may be useful in some cases to increase the viscosity of the resin and augment the mixing process. Thus, the temperature during mixing is usually from about 70 to about 200° F. Such heating, when employed, is usually done in any convenient manner such as by conduction or convection heating. In some instances to facilitate the mixing process it may be useful to add the components of the filler mixture to the resin in order of increasing particle size. This may facilitate wetting and speed the mixing process.

The resin(s) and amount will vary depending upon the other ingredients, the desired applications, and properties. Generally, any resin that is capable of being pumped to or placed in the desired location and setting may prove useful.

For example, typical thermosetting resins may be employed and may be selected from the group consisting of an epoxy resin, a polyester resin, a vinyl ester resin, a polyurethane resin, a carboxylic based resin, a phenolic based resin, a furan based resin, a cross-linked thermoplastic resin, an epoxy novolac, a cellulose based resin like rayon, and mixtures thereof. Generally, thermosetting resins useful in the present invention include those with gel times ranging from as little as 10 minutes to as many as 10 hours which gel times may be varied depending upon a particular catalyst(s), i.e., initiator(s), employed. Of course, these times may also advantageously be adjusted by use of promoters, inhibitors, and temperature adjustment.

Particularly preferred thermosetting resins include those that provide appropriate cost, mechanical properties, and processability for a given application. Generally, epoxy resins by themselves without an appropriate filler mixture and amount may prove inadequate for many applications. On the other hand, vinyl ester and polyester thermosetting resins may prove very useful in a number of cementing composition applications due to their low cost and often low viscosity. That is, preferred vinyl ester resins and preferred polyester resins may have a viscosity of at least about 100, or at least about 120 up to about 5000, or up to about 500 centipoise as measured on a Brookfield viscometer at 60 rpm/60 seconds at 25° C. Such resins may be highly cross-linked such as cross-linked terephthalic based polyester resins or cross-linked isophthalic polyester resins or crosslinked orthophthalic polyester resins or crosslinked cycloaliphatic based polyester resins. Typically, other components in these resins may include, for example, maleic anhydride and a glycol and a crosslinking agent like styrene or an acrylic.

Another particularly useful resin may include a polyester resin with or without styrene or an acrylic cross-linking agent. Should styrene be desired usual amounts may include from at least about 25%, or at least about 35% up to about 40%, or up to about 50%.

Other preferred thermosetting resins include, for example, epoxy resins such as the D.E.R.™ line of epoxy resins available from The Dow Chemical Company. Such resins include D.E.R.™ 331™ (CAS No. 25085-99-8/(25068-38-6)) which CAS information and D.E.R.™331™ specification sheet are incorporated by reference herein. Such epoxy resins are often liquid reaction products of epichlorohydrin and bisphenol A that may be cured at ambient conditions or elevated temperatures with a variety of curing agents such as aliphatic polyamines, polyamides, amidoamines, cycloaliphatic amines. In some instances, curing thermosetting resins such as these and others at an elevated temperature may improve chemical resistance, glass transition temperature, or other properties.

References such as *Plastics Materials* by J. A. Brydson published by Butterworth-Heinemann (ISBN-10: 0750641320 and ISBN-13: 978-0750641326) and *Introduction to Polymer Science* by V. R. Gowarikar, N. V. Vishwanathan, Jayadev Sreedhar published by New Age International Pvt Ltd Publishers (ISBN-10: 0852263074 and ISBN-13: 978-0852263075) may be useful in selecting a specific class of thermosetting resins for a particular desired application and are incorporated by reference herein to the extent that they are not inconsistent with the instant specification.

The amount of thermosetting resin employed varies by type of resin, other components, and the desired application. Generally, the amount of thermosetting resin is at least about 5, or at least about 10, or at least about 13 weight percent based on the total weight of resin and filler mixture. On the other hand, generally the amount of thermosetting resin is usually less than about 35, or less than about 25, or less than about 17 weight percent based on the total weight of resin and filler mixture.

The catalyst selected should be selected based upon the thermosetting resin and desired curing characteristics. Suitable catalysts include those typically used with thermosetting resins such as heat or time, as well as, chemical catalysts such as peroxide, amines, anhydrides, phenolics, halides, oxides and many others may be useful in selecting a specific class of thermosetting resins for a particular desired application. Such catalysts and use in thermosetting resins are described in detail in references such as *Plastics Materials* by J. A. Brydson published by Butterworth-Heinemann (ISBN-10: 0750641320 and ISBN-13: 978-0750641326) and *Introduction to Polymer Science* by V. R. Gowarikar, N. V. Vishwanathan, Jayadev Sreedhar published by New Age International Pvt Ltd Publishers (ISBN-10: 0852263074 and ISBN-13: 978-0852263075) which are incorporated by reference herein to the extent that they are not inconsistent with the instant specification.

The catalyst may be mixed with the suspension in any convenient manner to cause the desired curing to begin and may vary depending upon the application. That is, the catalyst may be mixed with the suspension prior to, simultaneously with, or subsequent to pumping of the suspension. In a particularly preferable embodiment, the catalyst is maintained on-site and mixed into the suspension immediately before pumping.

If desired, a catalyst "kicker" or accelerator may be employed as known in the art. The may be employed prior to, simultaneously with, or subsequent to any catalyst addition in any convenient manner.

Density Control

The density of the suspension should preferably be suitable for pumping the suspension to the desired location which may involve, for example, displacing well fluid. Accordingly, the control of the density of the suspension may prove useful for some applications. Typical densities of the formulations described herein are usually from about 6 lb/gal to about 30 lb/gal. Advantageously, density of the suspensions described herein may often be controlled in a number of ways. For example, the ratios of various components of varying densities may be varied. Alternatively, various additives may be employed such as, for example, beads made of glass or other materials, closed cell foam or other cellular structures, microspheres made of glass, polymers, silicates, etc., higher density materials than that of the suspension, and/or nitrogen or other traditional foaming methods to reduce density.

Control of Mechanical Properties

The mechanical properties of the cured composition may be controlled via a number of different mechanisms that will become apparent to the skilled artisan with the benefit of the instant specification and with routine experimentation. For example, the tensile strength and/or compression strength and/or flex strength may be conveniently controlled by, for example, with the choice of thermosetting resin. That is, should one desire to modify the tensile strength and/or compression strength and/or flex strength then one may alter the type or amount of thermosetting resin. Generally, epoxy resins give higher tensile, compression and flex strength than vinyl ester resins which give higher tensile, compression, and flex strength than polyester resins. Thus, the tensile, compression, and/or flex strength may be modified by employing more or less of the various resins as desired.

Advantageously, flex strength may also be readily controlled in many compositions via control of the type and amount of thermosetting resin or resins employed. For example, if higher flex strength is necessary for a thermosetting resin such as a polyester resin then one may increase the aromatic content of the polymer backbone. That is, one may change maleic anhydride to, for example, phthalic anhydride and/or increase the ratio of maleic anhydride to phthalic anhydride. Higher flex strength may also be obtained by, for example, using additives that augment the binding between thermosetting resin and any filler and/or fiber components.

Similarly, compression strength may be increased by a number of methods. For example, if one desires a higher compression strength then a higher modulus resin such as an epoxy resin may be employed. Alternatively or additionally, raising the amount of filler content may also increase the compression strength in some instances.

The glass transition temperature, Tg, may also be controlled via the type and amount of thermosetting resin. For example, to raise the glass transition temperature of a given composition one may add or increase the amount of vinyl ester resin relative to any polyester resin. In this manner, one may sometimes adjust the Tg upward by as much as 20-40° C.

Advantageously, the fracture toughness and/or resistance to crack propagation may also be controlled. One way of doing so is by the addition or introduction of reactive diluents such as rubbers (e.g., isoprene, butadiene) onto the thermosetting resin backbone. This often will increase the fracture toughness and/or resistance to crack propagation of the cured compositions. Alternatively or additionally, the blending of rubbers or other highly tough materials into the suspension may assist in a similar manner.

Additives

Other additives may be employed in various amounts as may be useful or desired so long as they do not substantially interfere with desired characteristics for a given application. Such additives may include those that assist with rheological properties, density, curing, emulsifying, pH control, dispersing, wetting, environmental resistance, chemical resistance, hardness, stabilizers, and modifiers for abrasion resistance and the like.

A particularly useful additive may be fibers. The addition of fiber may be used to increase tensile and flex strength of the compositions. The type and amount of fiber addition may vary depending upon the other components and how much tensile or flex strength is desired. Typically, the addition of such fibers comprised of glass, carbon, Kevlar, polymers, or inorganic minerals like basalt, etc. may be useful. These added fibers may take any form, for example, chopped, continuous, woven, etc. Typical amounts of added fibers may be at least about 0.5, or at least about 4, or at least about 10 up to about 20, or up to about 45 weight percent based on the total weight of the composition.

Intercalatable or Exfoliatable Nanoclay Compositions

The present invention also pertains to novel compositions which may be useful for downhole cementing operations, as well as, a host of other application such as above and below ground civil structures, mining structures, decking, paving, roofing, utility enclosures, manholes, below ground pre-cast structures, etc. The composition is similar to the previously mentioned composition above wherein an improvement comprises adding an intercalatable nanoclay, an exfoliatable nanoclay, or a mixture thereof. The nanoclay may assist in adding toughness to the composition such that a cured composition exhibits less crack propagation when subjected to stress. While not wishing to be bound to any particular theory it is believed that when the nanoclay is intercalated via ultrasound or other means, then the path of any crack becomes more tortuous such that it is less linear.

Typical compositions containing nanoclay may comprise a thermosetting resin, a microscopic filler, an aggregate, and an intercalatable and/or exfoliatable nanoclay. The amounts of each may vary depending upon the application. Generally, useful compositions may comprise:

(1) from about 10 or from about 13 up to about 17 or up to about 25 weight percent of a thermosetting resin based on the total weight of the composition;

(2) from about 15 to about 25 weight percent of a microscopic filler based on the total weight of the composition;

(3) from about 30 to about 70 weight percent of an aggregate based on the total weight of the composition; and (4) an intercalatable nanoclay, an exfoliatable nanoclay, or a mixture thereof.

The amount and type of nanoclay employed, of course, depends on the other components and desired characteristics. However, in some instances the nanoclay may comprises from about 0.5 to about 2 weight percent based on the total weight of the composition. Suitable nanoclays include, for example, montmorillonite, bentonite, various silicates, quartzes and other mineral compounds. As described above, a catalyst is usually employed to begin the curing process. Those catalysts described above may be employed so long as they do not significantly interfere with intercalation and/or substantially degrade the nanoclay.

Unless specifically defined otherwise, all technical or scientific terms used herein have the same meaning as commonly understood by one of ordinary skill in the art to which this invention belongs. Although any methods and materials similar or equivalent to those described herein can be used in the practice or testing of the present invention, the preferred methods and materials are better illustrated by the use of the following non-limiting examples, which are offered by way of illustration and not by way of limitation.

EXAMPLES

The following examples are presented to further illustrate and explain the claimed subject matter and should not be taken as limiting in any regard. All weight percentages are based on the total composition unless stated otherwise and all mixing is conducted at ambient temperatures unless stated otherwise.

Example 1

41% by weight of an unsaturated polyester resin is mixed with 41% by weight of calcium carbonate with a particle size distribution ranging from 5 to 20 microns and 18 percent by weight of chopped glass fiber. The mixture is stirred until it appears to be a substantially homogeneous suspension. The suspension can then be mixed with a curing agent such as benzoyl peroxide or methyl ethyl ketone peroxide and pumped or placed in a desired location such as an annulus of a wellbore.

Depending upon resin chemistry and particle size distribution the cured compositions may yield the following range of properties using the ASTM testing methods described above:

Density of 1.3 to 1.7 gm/cc; Tensile Strength of 1000-5000 psi; Flex strength of 5000-10000 psi; Compressive strength in the range of 7000-20000 psi; a fracture toughness of 0.2 to 1.3 MPa root meter; and a glass transition temperature of 60 to 150° C.

Example 2

In a similar manner as Example 1, 15% by weight of an unsaturated polyester resin is mixed with 30% sand (#12 and

20), 35% of #5 gravel, and 20% of CaCO3 to form a substantially homogeneous suspension. The suspension can then be mixed with a curing agent such as benzoyl peroxide or methyl ethyl ketone peroxide and pumped or placed in a desired location such as an annulus of a wellbore.

Depending upon resin chemistry and particle size distribution the cured compositions may yield the following range of properties using the ASTM testing methods described above:

Tensile strength of 1000-1400 psi; Compressive Strength of 8000-22000 psi; Flex strength of 2000-8000 psi; Density of 2.2-2.5 gm/cc; glass transition temp of about 60-150 C; and a fracture toughness of 0.3 to 0.6 MPa root meter.

Example 3

Example 1 is repeated except that 10-30% by weight of glass beads or microspheres are substituted for an equal portion of the resin and filler.

Depending upon resin chemistry and particle size distribution the cured compositions may yield the following range of properties using the ASTM testing methods described above:

Tensile strength of 1000-3000 psi; Compressive Strength of 6000-20000 psi; Flex strength of 2000-8000 psi; Density of 0.7-1.3 gm/cc; glass transition temp of about 60-150 C; and a fracture toughness of 0.3 to 0.6 MPa root meter.

Example 4

Example 2 is repeated except that about 2% by weight of chopped fiber (glass, carbon, basalt, etc) are substituted for an equal portion of the resin and filler.

Depending upon resin chemistry and particle size distribution the cured compositions may yield the following range of properties using the ASTM testing methods described above:

Tensile strength of 1000-3000 psi; Compressive Strength of 8000-22000 psi; Flex strength of 2500-9500 psi; Density of 0.7-1.3 gm/cc; glass transition temp of about 60-150 C; and a fracture toughness of 0.3 to 0.6 MPa root meter.

Example 5

Example 2 is repeated except that 30% by weight epoxy resin and 15% by weight of sand are employed instead of the polyester and gravel and mixing is conducted at from 150-200 F.

Depending upon resin chemistry and particle size distribution the cured compositions may yield the following range of properties using the ASTM testing methods described above:

Tensile strength of 3000-6000 psi; Compressive Strength of 5000-25000 psi; Flex strength of 3000-11000 psi; Density of 0.7-1.3 gm/cc; glass transition temp of about 100-400 C; and a fracture toughness of 0.6 to 1.5 MPa root meter.

Example 6

Example 2 is repeated except that additional sand is employed instead of gravel.

Depending upon resin chemistry and particle size distribution the cured compositions may yield the following range of properties using the ASTM testing methods described above:

Tensile strength of 1000-1400 psi; Compressive Strength of 8000-22000 psi; Flex strength of 2000-8000 psi; Density of 2.2-2.5 gm/cc; glass transition temp of about 60-150 C; and a fracture toughness of 0.3 to 0.6 MPa root meter.

Example 7

Example 2 is repeated except that vinyl ester resin is employed in place of polyester resin.

Depending upon resin chemistry and particle size distribution the cured compositions may yield the following range of properties using the ASTM testing methods described above:

Tensile strength of 1000-2500 psi; Compressive Strength of 8000-22000 psi; Flex strength of 3000-8000 psi; Density of 2.2-2.5 gm/cc; glass transition temp of about 80-125 C; and a fracture toughness of 0.2 to 1.2 MPa root meter.

The claimed subject matter is not to be limited in scope by the specific embodiments described herein. Indeed, various modifications of the invention in addition to those described herein will become apparent to those skilled in the art from the foregoing description. Such modifications are intended to fall within the scope of the appended claims.

All references cited herein are incorporated herein by reference in their entirety to the extent that they are not inconsistent and for all purposes to the same extent as if each individual publication, patent or patent application was specifically and individually indicated to be incorporated by reference in its entirety for all purposes.

The citation of any publication is for its disclosure prior to the filing date and should not be construed as an admission that the present invention is not entitled to antedate such publication by virtue of prior invention.

What is claimed is:

1. A method of cementing a well comprising pumping a suspension comprising:
 (1) a filler mixture;
 (2) at least about 5 weight percent of a thermosetting resin selected from the group consisting of polyester resin, a vinyl ester resin, and mixtures thereof based on the total weight of resin and filler mixture; and
   mixing a catalyst with the suspension wherein the suspension cures when said catalyst is mixed with the suspension and wherein the cured composition comprises one or more of the following characteristics:
   (a) a tensile strength of at least about 30 psi according to ASTM C1273 with a 0.01 inch/min of cross-head speed at ambient 25C at 50% humidity;
   (b) a compression strength of at least about 1500 psi according to ASTM C873 with a 0.01 inch/min of cross-head speed at ambient 25C at 50% humidity;
   (c) a flex strength of at least about 500 psi according to ASTM C873 with a 0.01 inch/min of cross-head speed at ambient 25C at 50% humidity;
   (e) a fracture toughness of at least about 0.3 Mpa root meter according to ASTM C1421;
   (f) a ratio of tensile strength to compressive strength of at least about 10% wherein the tensile strength is measured according to ASTM C1273 with a 0.01 inch/min of cross-head speed at ambient 25C at 50% humidity and the compression strength is measured according to ASTM 873 with a 0.01 inch/min of cross-head speed at ambient 25C at 50% humidity; and
   (g) a flex fatigue resistance such that the cured composition can be subjected to a stress of 50% of the cured composition's ultimate failure strength for at least 1000 cycles without breaking.

2. The process of claim 1 wherein the filler mixture comprises an organic material, an inorganic material, or a mixture thereof.

3. The process of claim 1 wherein the filler mixture is selected from the group consisting of calcium carbonate, kaolin, talc, silica, rock, gravel, sand, minerals, allotropic carbon, silicates, metallics, and mixtures thereof.

4. The process of claim 1 wherein the filler mixture comprises a first component selected from the group consisting of calcium carbonate, talc, silica, and mixtures thereof and a second component selected from the group consisting of crushed rock, gravel, sand and mixtures thereof.

5. The process of claim 4 wherein the first component comprises from about 15 to about 25 weight percent based on the total weight of resin and filler mixture.

6. The process of claim 4 wherein the second component comprises from about 30 to about 70 weight percent based on the total weight of resin and filler mixture.

7. The process of claim 4 wherein the first component has a particle size distribution of from about 0.5 microns to about 100 microns based on laser scattering.

8. The process of claim 1 wherein the catalyst is mixed the suspension prior to, simultaneously with, or subsequent to pumping.

9. The process of claim 1 wherein the cured composition comprises three or more or more of the following characteristics:
   (a) a tensile strength of at least about 300 psi according to ASTM C1273 with a 0.01 inch/min of cross-head speed at ambient 25C at 50% humidity;
   (b) a compression strength of at least about 1500 psi according to ASTM C873 with a 0.01 inch/min of cross-head speed at ambient 25C at 50% humidity;
   (c) a flex strength of at least about 500 psi according to ASTM C873 with a 0.01 inch/min of cross-head speed at ambient 25C at 50% humidity;
   (e) a fracture toughness of at least about 0.3 Mpa root meter according to ASTM C1421;
   (f) a ratio of tensile strength to compressive strength of at least about 10% wherein the tensile strength is measured according to ASTM C1273 with a 0.01 inch/min of cross-head speed at ambient 25C at 50% humidity and the compression strength is measured according to ASTM 873 with a 0.01 inch/min of cross-head speed at ambient 25C at 50% humidity; and
   (g) a flex fatigue resistance such that the cured composition can be subjected to a stress of 50% of the cured composition's ultimate failure strength for at least 1000 cycles without breaking.

10. The process of claim 1 wherein the cured composition comprises four or more or more of the following characteristics:
   (a) a tensile strength of at least about 300 psi according to ASTM C1273 with a 0.01 inch/min of cross-head speed at ambient 25C at 50% humidity;
   (b) a compression strength of at least about 1500 psi according to ASTM C873 with a 0.01 inch/min of cross-head speed at ambient 25C at 50% humidity;
   (c) a flex strength of at least about 500 psi according to ASTM C873 with a 0.01 inch/min of cross-head speed at ambient 25C at 50% humidity;
   (e) a fracture toughness of at least about 0.3 Mpa root meter according to ASTM C1421;
   (f) a ratio of tensile strength to compressive strength of at least about 10% wherein the tensile strength is measured according to ASTM C1273 with a 0.01 inch/min of cross-head speed at ambient 25C at 50% humidity and the compression strength is measured according to ASTM 873 with a 0.01 inch/min of cross-head speed at ambient 25C at 50% humidity; and
   (g) a flex fatigue resistance such that the cured composition can be subjected to a stress of 50% of the cured composition's ultimate failure strength for at least 1000 cycles without breaking.

11. The process of claim 1 wherein the cured composition comprises five or more or more of the following characteristics:
   (a) a tensile strength of at least about 300 psi according to ASTM C1273 with a 0.01 inch/min of cross-head speed at ambient 25C at 50% humidity;
   (b) a compression strength of at least about 11500 psi according to ASTM C873 with a 0.01 inch/min of cross-head speed at ambient 25C at 50% humidity;
   (c) a flex strength of at least about 500 psi according to ASTM C873 with a 0.01 inch/min of cross-head speed at ambient 25C at 50% humidity;
   (e) a fracture toughness of at least about 0.3 Mpa root meter according to ASTM C11421;
   (f) a ratio of tensile strength to compressive strength of at least about 10% wherein the tensile strength is measured according to ASTM C1273 with a 0.01 inch/min of cross-head speed at ambient 25C at 50% humidity and the compression strength is measured according to ASTM 873 with a 0.01 inch/min of cross-head speed at ambient 25C at 50% humidity; and
   (g) a flex fatigue resistance such that the cured composition can be subjected to a stress of 50% of the cured composition's ultimate failure strength for at least 1000 cycles without breaking.

12. The method of claim 1, further comprising the step of drilling the well and running a casing, wherein the step of cementing applies to cement the casing.

13. The method of claim 1 wherein the suspension comprises substantially no hexavalent chromium compounds.

14. The method of claim 1 wherein the suspension comprises substantially no water.

15. A method of cementing a subterranean formation comprising the step of pumping a suspension comprising:
(1) from about 15 to about 25 weight percent based on the total weight of the suspension of a first component selected from the group consisting of calcium carbonate, talc, silica, and mixtures thereof;
(2) from about 30 to about 70 weight percent based on the total weight of the suspension of a second component selected from the group consisting of crushed rock, gravel, sand and mixtures thereof;
(3) from about 10 to about 25 weight percent based on the total weight of the suspension of a thermosetting resin; and
(4) a catalyst capable causing the suspension to cure;
wherein the cured composition is characterized by a ratio of tensile strength to compressive strength of at least about 10 wherein the tensile strength is measured according to ASTM C1273 with a 0.01 inch/min of cross-head speed at ambient 25C at 50% humidity and the compression strength is measured according to ASTM 873 with a 0.01 inch/min of cross-head speed at ambient 25C at 50% humidity.

16. The method of claim 15 wherein the thermosetting resin is selected from the group consisting of an epoxy resin, a polyester resin, a vinyl ester resin, a polyurethane resin, a carboxylic based resin, a phenolic based resin, a cross-linked thermoplastic resin, an epoxy novolac, a cellulose based resin, and mixtures thereof.

17. The method of claim 15 wherein the thermosetting resin is selected from the group consisting of a polyester resin, a vinyl ester resin, and mixtures thereof.

18. The method of claim 15 wherein the first component has a particle size distribution of from about 0.5 microns to about 100 microns based on laser scattering.

* * * * *

UNITED STATES PATENT AND TRADEMARK OFFICE
CERTIFICATE OF CORRECTION

| | | |
|---|---|---|
| PATENT NO. | : 8,387,695 B1 | Page 1 of 1 |
| APPLICATION NO. | : 13/531540 | |
| DATED | : March 5, 2013 | |
| INVENTOR(S) | : Ruchir M. Shanbhag | |

It is certified that error appears in the above-identified patent and that said Letters Patent is hereby corrected as shown below:

In The Claims

Column 10, line 36 should read --(a) a tensile strength of at least about 300 psi according to--

Signed and Sealed this
Seventeenth Day of May, 2016

Michelle K. Lee
*Director of the United States Patent and Trademark Office*